US012805557B2

(12) United States Patent
Sharma et al.

(10) Patent No.: US 12,805,557 B2
(45) Date of Patent: Nov. 24, 2026

(54) ANTICAKING AGENT

(71) Applicant: OMYA INTERNATIONAL AG, Oftringen (CH)

(72) Inventors: Lalit Sharma, Zofingen (CH); Marcel Lex, Hirschau (CH); Renata Negrini, Zurich (CH); Tanja Budde, Brittnau (CH); Stefan Lander, Rupperswil (CH)

(73) Assignee: Omya International AG, Oftringen (CH)

( * ) Notice: Subject to any disclaimer, the term of this patent is extended or adjusted under 35 U.S.C. 154(b) by 802 days.

(21) Appl. No.: 17/759,522

(22) PCT Filed: Feb. 23, 2021

(86) PCT No.: PCT/EP2021/054420
§ 371 (c)(1),
(2) Date: Jul. 27, 2022

(87) PCT Pub. No.: WO2021/175658
PCT Pub. Date: Sep. 10, 2021

(65) Prior Publication Data

US 2023/0066368 A1 Mar. 2, 2023

(30) Foreign Application Priority Data

Mar. 3, 2020 (EP) .................................... 20160653

(51) Int. Cl.
*A23P 10/43* (2016.01)
*A23K 20/24* (2016.01)
*A23L 29/00* (2016.01)

(52) U.S. Cl.
CPC ............. *A23P 10/43* (2016.08); *A23L 29/015* (2016.08); *A23K 20/24* (2016.05)

(58) Field of Classification Search
CPC ........ A23P 10/43; A23L 29/015; A23K 20/24
See application file for complete search history.

(56) References Cited

U.S. PATENT DOCUMENTS

| | | | |
|---|---|---|---|
| 10,780,031 | B2 | 9/2020 | Budde et al. |
| 11,433,009 | B2 | 9/2022 | Budde et al. |

(Continued)

FOREIGN PATENT DOCUMENTS

| | | | |
|---|---|---|---|
| EP | 0607840 | A1 | 1/1994 |
| EP | 1712523 | A1 | 10/2006 |

(Continued)

OTHER PUBLICATIONS

Combes et al., "Calcium carbonate-calcium phosphate mixed cement composition for bone reconstruction". Journal of Biomedical Materials Research Part A vol. 79A, Issue 2, pp. 225-450 (Nov. 2006). (Year: 2006).*

(Continued)

*Primary Examiner* — Erik Kashnikow
*Assistant Examiner* — Assaf Zilbering
(74) *Attorney, Agent, or Firm* — Heslin Rothenberg Farley & Mesiti P.C.

(57) ABSTRACT

The present invention refers to the use of a calcium carbonate-based composition as an anticaking agent, wherein the calcium carbonate-based composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source. Furthermore, the present invention refers to a particulate composition comprising such an anticaking agent, and to a method for producing such a particulate composition.

11 Claims, 3 Drawing Sheets

(56) References Cited

U.S. PATENT DOCUMENTS

Figure 1:
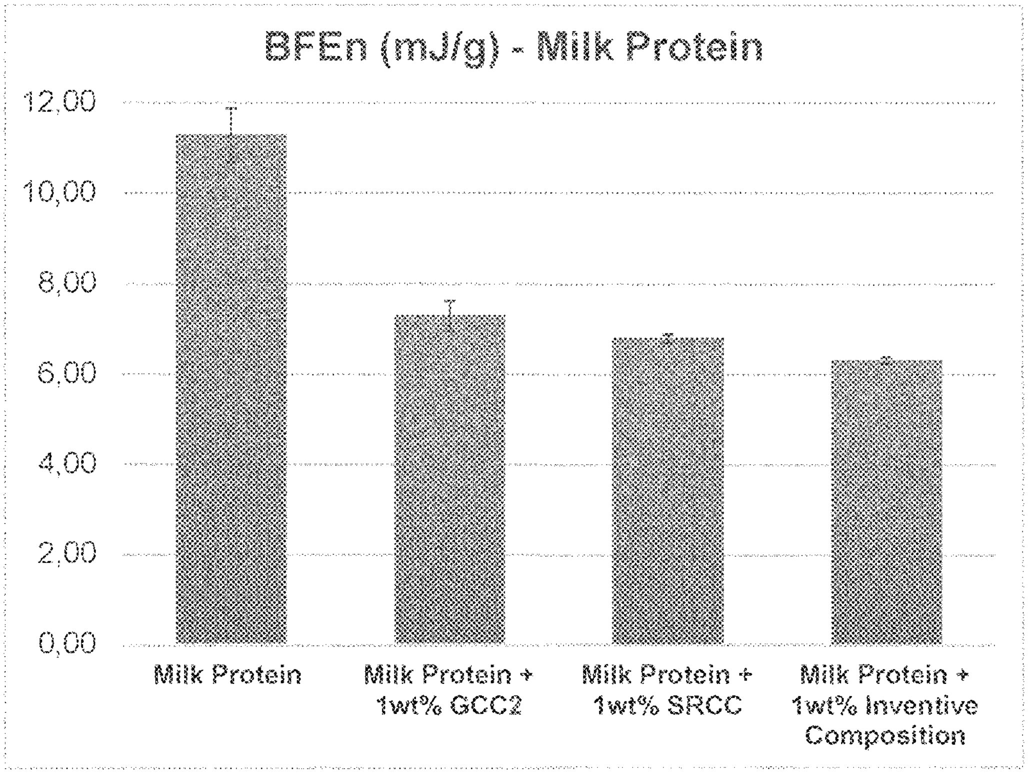

| | | | |
|---|---|---|---|
| 2004/0020410 A1 | 2/2004 | Gane et al. |
| 2015/0218381 A1 | 8/2015 | O'Halloran et al. |
| 2016/0271025 A1 | 9/2016 | Budde et al. |
| 2018/0051175 A1 | 2/2018 | Werner et al. |
| 2022/0273524 A1 | 9/2022 | Sharma et al. |
| 2023/0233424 A1 | 7/2023 | Sharma et al. |

FOREIGN PATENT DOCUMENTS

| | | | |
|---|---|---|---|
| EP | 1712597 | A1 | 10/2006 |
| EP | 2264108 | A1 | 6/2009 |
| EP | 2264109 | A1 | 12/2010 |
| EP | 2524898 | A1 | 11/2012 |
| EP | 2371766 | B1 | 3/2013 |
| EP | 2447213 | A1 | 4/2015 |
| EP | 2883573 | A1 | 6/2015 |
| EP | 2997833 | A1 | 3/2016 |
| EP | 3085742 | A1 | 10/2016 |
| EP | 3360601 | A1 | 8/2018 |
| EP | 3385335 | A1 | 10/2018 |
| EP | 3400810 | A1 | 11/2018 |
| EP | 3517176 | A1 | 7/2019 |
| JP | 2018525456 | A | 11/2019 |
| WO | 0039222 | A1 | 7/2000 |
| WO | 2004083316 | A1 | 9/2004 |
| WO | 2005121257 | A2 | 12/2005 |
| WO | 2009074492 | A1 | 6/2009 |
| WO | 2012140028 | A1 | 10/2012 |
| WO | 2013142473 | A1 | 9/2013 |
| WO | 2016102134 | A1 | 6/2016 |
| WO | 2019055082 | A1 | 3/2019 |

OTHER PUBLICATIONS

Combes et al., "Calcium carbonate-calcium phosphate mixed cement compositions for bone reconstruction". Journal of Biomedical Materials Research Part A vol. 79A, Issue 2, pp. 225-450 (Nov. 2006). (Year: 2006).*

Harrigan., "Measuring Cement Particle Size and Surface Area by Laser Diffraction". Available online at https://transops.s3.amazonaws.com/uploaded_files/Measuring%20Cement%20Particle%20Size%20and%20Surface%20Area%20b (Year: 2013).*

International Search Report and Written Opinion issued in PCT/EP2021/054420 mailed May 20, 2021.

Patrick A. Gane et al., "Void Space Structure of Compressible Polymer Spheres and Consolidated Calcium Carbonate Paper-Coating Formulations," Industrial and Engineering Chemistry Research, 35(5), 1996, pp. 1753-1764.

International Search Report and Written Opinion in International Application No. PCT/EP2020/068838, 18 pages. Sep. 16, 2020.

International Search Report and Written Opinion in International Application No. PCT/EP2021/063347, 19 pages. Jun. 24, 2021.

* cited by examiner

ANTICAKING AGENT

CROSS REFERENCE TO RELATED APPLICATIONS

This application is a U.S. National Phase filing under 35 U.S.C. § 371 of International Application PCT/EP2021/054420, filed Feb. 23, 2021, and published as WO 2021/175658 A1 on Sep. 10, 2021. PCT/EP2021/054420 claims priority from European patent application number 20160653.0, filed Mar. 3, 2020. The entire contents of each of these prior applications are hereby incorporated herein by reference.

The present invention relates to the use of a calcium carbonate-based composition as an anticaking agent. Furthermore, the invention refers to a particulate composition comprising such an anticaking agent, and a method for producing such a particulate composition.

Particulate compositions of detergents, fertilizers, food or feed powders, pharmaceutical compositions, cosmetic powders, salts and the like can agglomerate, especially when stored at rest. This phenomenon is also referred to as caking. Caking can occur at nearly any temperature and nearly any relative humidity, but most of the time storage and/or handling of a composition at higher temperature or at higher relative humidity will result in a more pronounced caking problem.

Caking results in the hardening of such particulate compositions and in a certain period of time aggregates or lumps are formed within the particulate compositions. This aggregation may result in many problems and economical losses. For example, caked powders are not suitable for further blending or cannot be properly discharged in automated installations. These products must then be processed with a hammer mill, or remelted or simply thrown away, which can create enormous additional costs and wasted resources. Furthermore, customers often consider it as a loss of quality if particulate compositions like salt or sugar are not flowable anymore after some time but form lumps in the packaging.

Today most producers use anticaking agents in order to control, reduce or prevent the caking of particulate matter such as powders or granules. Examples of typical anticaking additives are wheat flour, native starch, natural ground calcium carbonate, phosphates, silicon dioxide, or calcium silicate. Depending on the field of application, these anticaking agents have sometimes to be used in high amounts to control, reduce or prevent caking in the desired compositions.

In many fields of application, and especially in food industry, additives like anticaking agents have to be labelled in the list of ingredients in the order of the amount contained in the respective composition or product. Therefore, it is desirable to use anticaking agents in low amounts.

EP2997833 A1 refers to the use of surface-reacted calcium carbonate as anti-caking agent, which can be used in comparatively low amounts. Further anticaking agents that may be used in a reduced amount at good anticaking efficacy are fumed or precipitated silica particles. Fumed or precipitated silica particles usually comprise nanosized primary particles. For example, the food additive, silicon dioxide (E 551), is a material comprised of aggregated nanosized primary particles. These aggregates can further agglomerate to form larger structures. The sizes of the aggregates and agglomerates are normally greater than 100 nm. However, depending on the starting material and/or on the manufacturing process, it cannot be excluded that some aggregates of primary particles are smaller than 100 nm in size (see "Re-evaluation of silicon dioxide (E 551) as a food additive", EFSA Journal, 2018, Volume 16). The safety of nanosized silica particles as food additives is still a controversial topic and has not yet been conclusively clarified. Similar applies for the application of nanosized silica in the field of feed, nutraceutical or cosmetic products. In view thereof, customers are often reluctant to choose products that contain silicon dioxide particles as additives.

In view of the foregoing, there is a continuous need for alternative or improved agents for controlling, reducing or preventing caking.

It is the object of the present invention to provide an alternative or improved agent for use as an anticaking agent.

The foregoing object is achieved by the use, the particulate composition and the method as defined in the independent claims.

One aspect of the present invention is the use of a calcium carbonate-based composition as an anticaking agent, wherein the calcium carbonate-based composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source.

Another aspect of the present invention is a particulate composition comprising a calcium carbonate-based anticaking composition and a base component, wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source, wherein the particulate composition comprises the calcium carbonate-based anticaking composition in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition.

Another aspect of the present invention is a method for the production of a particulate composition, the method comprising the step of mixing a calcium carbonate-based anticaking composition with a base component, wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source, and wherein the calcium carbonate-based anticaking composition is admixed into the base component in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition.

Preferred embodiments of the present invention are defined in the dependent claims.

According to one embodiment of the present invention, the calcium carbonate-based composition consists of the first component and the second component.

According to one embodiment of the present invention, the weight ratio of the first component to the second component is in the range of 99:1 to 1:99, preferably in the range of 95:5 to 10:90, even more preferably in the range of 90:10 to 20:80, even more preferably in the range of 85:15 to 30:70, and most preferably in the range of 80:20 to 40:60.

According to one embodiment of the present invention, the first component is a natural ground calcium carbonate selected from the group consisting of marble, chalk, limestone, and mixtures thereof, or the first component is a precipitated calcium carbonate selected from the group consisting of precipitated calcium carbonates having an aragonitic, vateritic or calcitic crystal form, and mixtures thereof.

According to one embodiment of the present invention, the surface-reacted calcium carbonate is a reaction product of natural ground calcium carbonate selected from the group consisting of marble, chalk, limestone, and mixtures thereof, with carbon dioxide and at least one H3O+ ion donor, wherein the carbon dioxide is formed in situ by the at least one H3O+ ion donor treatment and/or is supplied from an external source, or the surface-reacted calcium carbonate is a reaction product of precipitated calcium carbonate selected from the group consisting of precipitated calcium carbonates having an aragonitic, vateritic or calcitic crystal form, and mixtures thereof, with carbon dioxide and at least one $H_3O^+$ ion donor, wherein the carbon dioxide is formed in situ by the at least one $H_3O^+$ ion donor treatment and/or is supplied from an external source.

According to one embodiment of the present invention, the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof, preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a cation selected from $Li^+$, $Na^+$ and/or $K^+$, $HPO_4^{2-}$, being at least partially neutralised by a cation selected from $Li^+$, $Na^+$, $K^+$, $Mg^{2+}$, and/or $Ca^{2+}$, and mixtures thereof, more preferably the at least one $H_3O^+$ ion donor is selected from the group consisting of hydrochloric acid, sulphuric acid, sulphurous acid, phosphoric acid, oxalic acid, or mixtures thereof, and most preferably the at least one $H_3O^+$ ion donor is phosphoric acid.

According to one embodiment of the present invention, the first component has a volume median particle size $d_{50}$ from 0.1 to 50 μm, preferably from 0.5 to 40 μm, more preferably from 0.5 to 20 μm, even more preferably from 0.5 to 10 μm, and most preferably from 0.8 to 8 μm, and/or the first component has a specific surface area of from 0.5 $m^2/g$ to 30 $m^2/g$, preferably from 1 $m^2/g$ to 20 $m^2/g$, and more preferably from 1 $m^2/g$ to 10 $m^2/g$, measured using nitrogen and the BET method.

According to one embodiment of the present invention, the second component has a volume median particle size $d_{50}$ from 0.5 to 50 μm, preferably from 1 to 40 μm, more preferably from 1.2 to 30 μm, and even more preferably from 1.5 to 15 μm, and most preferably from 3 to 10 μm, and/or the second component has a specific surface area of from 15 m2/g to 200 m2/g, preferably from 20 m2/g to 180 m2/g, more preferably from 25 m2/g to 160 m2/g, and most preferably from 70 m2/g to 120 m2/g, measured using nitrogen and the BET method.

According to one embodiment of the present invention, the calcium carbonate-based composition has a residual moisture of less than 10.0 wt. %, preferably less than 7.5 wt. %, and more preferably less than 5.0 wt. %, based on the total weight of the calcium carbonate-based composition.

According to one embodiment of the present invention, the calcium carbonate-based composition is added to a base component selected from the group consisting of a food composition, a feed composition, a nutraceutical composition, a pharmaceutical composition and a cosmetic composition, and preferably the composition is selected from a food composition or a feed composition.

According to one embodiment of the present invention, the calcium carbonate-based anticaking composition consists of the first component and the second component, and/or wherein the weight ratio of the first component to the second component in the calcium carbonate-based anticaking composition is in the range of 99:1 to 1:99, preferably in the range of 95:5 to 20:80, even more preferably in the range of 90:10 to 30:70, even more preferably in the range of 85:15 to 40:60, and most preferably in the range of 80:20 to 50:50.

According to one embodiment of the present invention, the base component is selected from the group consisting of a food composition, a feed composition, a nutraceutical composition, a pharmaceutical composition and a cosmetic composition, and preferably is a food composition or a feed composition.

According to one embodiment of the present invention, the food composition is food salt, curing salt, salt substitute, milk powder, skimmed milk powder, cream powder, egg powder, whey fat powder, protein powder, vending machine powder, grated cheese, sugar, powdered food flavour, spice, seasoning, packet soup mixture, baking mixture, pudding powder, mousse powder, or sauce powder, or the feed composition is pet food, milk replacer for animals, or mineral salt for animals.

It should be understood that for the purposes of the present invention, the following terms have the following meanings:

An "anticaking agent" in the meaning of the present invention is an agent, which is added to a particulate composition in order to reduce or prevent the caking and/or maintain or improve the flow properties of the particulate composition.

A "base component" in the meaning of the present invention is a particulate component, to which the anticaking agent is added.

The term "particulate" in the meaning of the present invention refers to a plurality of particles. Said particles may be defined by a specific particle size distribution. A "particulate" composition is for example composed of powder particles, granules, crumbles, tablets, globules, beads and/or pellets.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. PCC may be in the vateritic, calcitic or aragonitic crystal form. PCCs are described, for example, in EP2447213 A1, EP2524898 A1, EP2371766 A1, EP1712597 A1, EP1712523 A1, or WO2013/142473 A1.

The term "surface-reacted" in the meaning of the present application shall be used to indicate that a material has been subjected to a process comprising partial dissolution of said material upon treatment with an $H_3O^+$ ion donor (e.g., by use of water-soluble free acids and/or acidic salts) in aqueous environment followed by a crystallization process which may occur in the absence or presence of further crystallization additives.

An "$H_3O^+$ ion donor" in the context of the present invention is a Brønsted acid and/or an acid salt, i.e. a salt containing an acidic hydrogen.

The term "acid" as used herein refers to an acid in the meaning of the definition by Brønsted and Lowry (e.g., $H_2SO_4$, $HSO_4^-$). The term "free acid" refers only to those acids being in the fully protonated form (e.g., $H_2SO_4$).

The "particle size" of particulate materials is described by its distribution of particle sizes $d_x$. Unless indicated otherwise, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$(wt.) unless indicated otherwise. Particle sizes were determined by using a Sedigraph™ 5100 instrument or Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. Especially, the particle size of the natural ground calcium carbonate and the precipitated calcium carbonate that are used for preparing the surface-reacted calcium carbonate are defined as weight based particle sizes.

For certain materials specified herein, the "particle size" is described as volume-based particle size distribution. This is indicated, for example, by "volume based median particle size", "volume median particle size" or "volume top cut particle size". Volume median particle size $d_{50}$ was evaluated using a Malvern Mastersizer 2000 or 3000 Laser Diffraction System. The $d_{50}$ or $d_{98}$ value, measured using a Malvern Mastersizer 2000 or 3000 Laser Diffraction System, preferably a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005. The measurements were carried out in an aqueous solution of 0.1 wt.-% $Na_4P_2O_7$. Especially, the particle size of the natural ground calcium carbonate, the precipitated calcium carbonate, the surface-reacted calcium carbonate that are used in the calcium carbonate-based compositions of the present invention as well as the base component are defined as volume based particle sizes.

The "specific surface area" (expressed in $m^2/g$) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:2010. Prior to such measurements, the sample was filtered within a Buchner funnel, rinsed with deionised water and dried at 110° C. in an oven for at least 12 hours. The total surface area (in $m^2$) of said material can be obtained by multiplication of the specific surface area (in $m^2/g$) and the mass (in g) of the material.

In the context of the present invention, the term "pore" is to be understood as describing the space that is found between and/or within particles, i.e. that is formed by the particles as they pack together under nearest neighbour contact (interparticle pores), such as in a powder or a compact and/or the void space within porous particles (intraparticle pores), and that allows the passage of liquids under pressure when saturated by the liquid and/or supports absorption of surface wetting liquids.

Unless specified otherwise, the term "drying" refers to a process according to which at least a portion of water is removed from a material to be dried such that a constant weight of the obtained "dried" material at 200° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

For the purpose of the present application, "water-insoluble" materials are defined as those which, when mixed with 100 ml of deionised water and filtered at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of solid material following evaporation at 95 to 100° C. of 100 g of said liquid filtrate. In order to assess whether a material is an insoluble or soluble material in the meaning of the present invention, the sample size is greater than 0.1 g, preferably 0.5 g or more.

A "suspension" or "slurry" in the meaning of the present invention comprises undissolved solids and water, and optionally further additives, and usually contains large amounts of solids and, thus, is more viscous and can be of higher density than the liquid from which it is formed.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

In the following the invention is described in more detail.

Use of the Calcium Carbonate-Based Composition as Anticaking Agent

One aspect of the present invention refers to the use of a calcium carbonate-based composition as an anticaking agent, wherein the calcium carbonate-based composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source.

The inventors surprisingly found that a calcium carbonate-based composition containing a mixture of a natural ground calcium carbonate or a precipitated calcium carbonate (first component) with a surface-reacted calcium carbonate as described herein (second component) can advantageously be used as an anticaking agent for a particulate composition in order to reduce or prevent the caking of the composition and/or in order to maintain or improve the flow characteristics of the composition. Furthermore, it has been found by the inventors that the calcium carbonate-based composition has an improved anticaking effect and/or is a better flow aid than comparable known anticaking agents such as known calcium carbonate anticaking agents.

The use of the calcium carbonate-based composition as an anticaking agent as found by the inventors provides a use of an anticaking agent which is non-toxic, which is readily accessible, and which can be used in comparatively low amounts.

The anticaking effect and/or flow improvement provided to a particulate composition by adding the inventive calcium carbonate-based composition may be expressed in terms of the normalized basic flow energy (BFEnorm). The basic flow energy (BFE) is evaluated by rotating a precision blade down a helical path through a fixed volume of powder composition. During this downward traverse, the torque and axial force acting on the blade is measured and the resistance to flow in this dynamic state is calculated and expressed as a flow energy. The normalized basic flow energy (BFEnorm) is obtained by dividing the BFE by the mass of the powder in constant volume. The BFEnorm directly correlates to the flowability of the particulate composition. This means that a particulate composition having a lower BFEnorm has a better flowability than a composition having a higher BFEnorm. The process for determining the BFE and BFEnorm of a composition is known to the skilled person.

According to one embodiment, the anticaking composition according to the invention has an anticaking effect, which is expressed by the normalized basic flow energy (BFEnorm) of a particulate composition comprising a base component and the inventive anticaking agent.

According to one embodiment of the invention, the normalized basic flow energy (BFEnorm) of a particulate composition comprising a base component and the inventive anticaking composition is at least 2%, e.g. at least 5%, e.g. at least 10%, lower than the normalized basic flow energy (BFEnorm) of a particulate composition comprising the same base component but not the inventive anticaking agent. According to one preferred embodiment of the invention, the normalized basic flow energy (BFEnorm) of a particulate composition comprising a base component and the inventive anticaking composition is at least 10% lower than the normalized basic flow energy (BFEnorm) of a particulate composition comprising, preferably consisting of, the same base component but not the inventive anticaking agent.

It is to be understood that the normalized basic flow energy (BFEnorm) of both compositions (i.e. the composition with inventive anticaking agent and the composition without inventive anticaking agent) is measured under the same conditions.

The anticaking effect and/or flow improvement provided to a particulate composition by adding the inventive calcium carbonate-based composition may further be expressed in terms of the aeration ratio (AR). The areation ratio is the ratio of BFE (in absence of air; air velocity=0) to BFE with the velocity of 18 mm/sec of air flow in the powder composition (air velocity=n).

$$\text{Areation Ratio } (AR) = \frac{BFE(\text{Air velocity} = 0)}{BFE(\text{Air velocity} = n)}$$

The areation ratio is inversely proportional to cohesivity of the powder composition. This means that a particulate composition having a higher aeration ratio has a better flowability than a composition having a lower aeration ratio.

Areation testing of powder is done by introduction of air into the base of the powder column and quantifies how this changes the flow properties by measuring the reduction in flow energy. A skilled person is familiar with the areation testing procedure.

According to one embodiment, the anticaking composition according to the invention has an anticaking effect, which is expressed by the aeration ratio of a particulate composition comprising a base component and the inventive anticaking composition.

According to one embodiment of the invention, the aeration ratio of a particulate composition comprising a base component and the inventive anticaking composition is at least 5%, e.g. at least 10%, e.g. at least 20%, e.g. at least 50%, higher than the aeration ratio of a particulate composition comprising the same base component but not the inventive anticaking composition.

According to one preferred embodiment of the invention, the aeration ratio of a particulate composition comprising a base component and the inventive anticaking composition is at least 25% higher than the aeration ratio of a particulate composition comprising, preferably consisting of, the same base component but not the inventive anticaking composition.

It is to be understood that the aeration ratio of both compositions (i.e. the composition with inventive anticaking agent and the composition without inventive anticaking agent) is measured under the same conditions.

Furthermore, the anticaking effect and/or flow improvement provided to a particulate composition by adding the inventive calcium carbonate-based composition may further be determined based on the presence and/or the depth of a caking crust in the particulate composition. A caking crust may form in the top layers of a powder composition by moisture which penetrates into the powder composition over time. The presence of the moisture in the composition may lead to aggregates, agglomerates and caking in the powder, which leads to deterioration of the powder quality. The depth of the caking crust in powder bulks is inversely proportional to the anticaking effect of the anticaking agent. This means that a particulate composition having no or a less deep caking crust shows less caking than a composition having a caking crust or a deeper caking crust.

According to one embodiment, the anticaking composition according to the invention has an anticaking effect, which is expressed by the depth of a caking crust being present on the surface of a particulate composition comprising a base component and the inventive anticaking composition.

According to one preferred embodiment, the depth of a caking crust being present on the surface of a particulate composition comprising a base component and the inventive anticaking composition is at least 2%, e.g. 5%, e.g. 10%, lower than the caking crust of a particulate composition comprising, preferably consisting of, the same base component but not the inventive anticaking composition.

It is to be understood that the depth of the caking crust of both compositions (i.e. the composition with inventive anticaking agent and the composition without inventive anticaking agent) is measured under the same conditions.

In addition to the foregoing anticaking effect, it has been found that a particulate composition containing the inventive calcium carbonate-based composition as anti-caking agent shows a reduced dusting, i.e. formation of fugitive dust when storing and/or handling the particulate composition, compared to a particulate composition containing a different anti-caking agent such as a silica-based anti-caking agent.

The calcium carbonate-based composition comprises a first component being a natural ground calcium carbonate or a precipitated calcium carbonate.

According to one embodiment, the first component has a volume median particle size d50 from 0.1 to 50 μm, preferably from 0.5 to 40 μm, more preferably from 0.5 to 20 μm, even more preferably from 0.5 to 10 μm, and most preferably from 0.8 to 8 μm, and/or the first component has a specific surface area of from 0.5 m2/g to 30 m2/g, preferably from 1 m2/g to 20 m2/g, and more preferably from 1 m2/g to 10 m2/g, measured using nitrogen and the BET method.

According to another embodiment, the first component has a volume median particle size d50 from 0.1 to 50 μm, preferably from 0.5 to 40 μm, more preferably from 0.5 to 20 μm, even more preferably from 0.5 to 10 μm, and most preferably from 0.8 to 8 μm, and the first component has a specific surface area of from 0.5 m2/g to 30 m2/g, preferably from 1 m2/g to 20 m2/g, and more preferably from 1 m2/g to 10 m2/g, measured using nitrogen and the BET method.

The first component of the calcium carbonate-based composition can have a specific residual moisture content. According to one embodiment, the first component has a residual moisture content of below 3.0 wt. %, preferably of below 2.0 wt. %, and more preferably of below 1.0 wt. %, based on the total weight of the first component. The skilled person knows how to determine the residual moisture content.

According to one preferred embodiment, the calcium carbonate-based composition comprises a first component being a natural ground calcium carbonate.

It is appreciated that the natural ground calcium carbonate can be one specific natural ground calcium carbonate or a mixture of different kinds of natural ground calcium carbonate(s).

In one embodiment of the present invention, the natural ground calcium carbonate comprises, preferably consists of, one kind of natural ground calcium carbonate. Alternatively, the natural ground calcium carbonate comprises, preferably consists of, two or more kinds of natural ground calcium carbonates. For example, the natural ground calcium carbonate comprises, preferably consists of, two or three kinds of natural ground calcium carbonates. Preferably, the natural ground calcium carbonate comprises, more preferably consists of, one kind of natural ground calcium carbonate.

In one embodiment of the present invention, the natural ground calcium carbonate is a ground calcium carbonate-containing mineral, preferably the calcium carbonate-containing mineral is selected from the group consisting of chalk, limestone, marble, dolomite and mixtures thereof.

In a preferred embodiment of the present invention, the natural ground calcium carbonate is selected from the group consisting of chalk, limestone or marble. More preferably, the natural ground calcium carbonate is limestone or marble, and most preferably marble.

A natural ground calcium carbonate may be obtained, for example, in a wet and/or dry comminution step, such as crushing and/or grinding, from natural calcium carbonate-containing minerals (e.g. chalk, limestone, marble or dolomite). According to one embodiment, the natural ground calcium carbonate is a wet-natural ground calcium carbonate. In another embodiment, the natural ground calcium carbonate is a dry-natural ground calcium carbonate.

The grinding step can be carried out with any conventional grinding device, for example, under conditions such that refinement predominantly results from impacts with a secondary body, i.e. in one or more of a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. The grinding step may also be performed under conditions such that autogenous grinding takes place and/or by horizontal ball milling, and/or other such processes known to the skilled man.

In one embodiment, grinding is carried out in a vertical or horizontal ball mill, preferably in a vertical ball mill. Such vertical and horizontal ball mills usually consist of a vertically or horizontally arranged, cylindrical grinding chamber comprising an axially fast rotating agitator shaft being equipped with a plurality of paddles and/or stirring discs, such as described for example in EP0607840 A1.

It is to be noted that grinding of the calcium carbonate-containing mineral may be carried out by using at least one of the aforementioned grinding methods or devices. However, it is also possible to use a combination of any of the foregoing methods or a series of any of the aforementioned grinding devices.

Subsequent to the grinding step, the ground calcium carbonate-containing mineral may, optionally, be divided into two or more fractions, each having different particle distributions, by use of a classifying step. A classifying step in general serves to divide a feed fraction having a certain particle size distribution into a coarse fraction, which may be subjected to another grinding cycle, and a fine fraction, which may be used as the final product. For this purpose, screening devices as well as gravity-based devices, such as centrifuges or cyclones (e.g. hydrocyclones) and any combination of the aforementioned devices may be used.

In case the first component of the calcium carbonate-based composition is a natural ground calcium carbonate, the natural ground calcium carbonate may have specific physical characteristics such as a specific particle size and/or a specific surface area.

According to one embodiment, the natural ground calcium carbonate has a volume median particle size d50 from 0.1 to 50 μm, preferably from 0.5 to 40 μm, more preferably from 0.5 to 20 μm, even more preferably from 0.5 to 10 μm, and most preferably from 0.8 to 8 μm, and/or a volume top cut particle size d98 of from 2 to 80 μm, preferably from 2 to 60 μm, more preferably 2 to 40 μm, even more preferably from 3 to 30 μm, and most preferably from 4 to 20 μm.

According to one embodiment, the natural ground calcium carbonate has a specific surface area of from 0.5 m2/g to 30 m2/g, preferably from 1 m2/g to 20 m2/g, and more preferably from 1 m2/g to 10 m2/g, measured using nitrogen and the BET method.

According to one preferred embodiment, the first component is a natural ground calcium carbonate having a volume median particle size d50 from 0.1 to 50 μm, preferably from 0.5 to 40 μm, more preferably from 0.5 to 20 μm, even more preferably from 0.5 to 10 μm, and most preferably from 0.8 to 8 μm, and a volume top cut particle size d98 of from 2 to 80 μm, preferably from 2 to 60 μm, more preferably 2 to 40 μm, even more preferably from 3 to 30 μm, and most preferably from 4 to 20 μm, and a specific surface area of from 0.5 m2/g to 30 m2/g, preferably from 1 m2/g to 20 m2/g, and more preferably from 1 m2/g to 10 m2/g, measured using nitrogen and the BET method.

In one embodiment, the natural ground calcium carbonate has a volume median particle size d50 from 0.8 to 8 μm, and a volume top cut particle size d98 of from 4 to 20 μm, and a specific surface area of from 1 m2/g to 10 m2/g, measured using nitrogen and the BET method. In one embodiment, the natural ground calcium carbonate has a volume median particle size d50 from 0.8 to 6 μm, and a volume top cut particle size d98 of from 4 to 18 μm, and a specific surface area of from 1 m2/g to 5 m2/g, measured using nitrogen and the BET method.

According to another embodiment, the first component of the calcium carbonate-based composition is a precipitated calcium carbonate.

It is appreciated that the precipitated calcium carbonate can be one or a mixture of different kinds of precipitated calcium carbonate(s).

In one embodiment of the present invention, the precipitated calcium carbonate comprises, preferably consists of, one kind of precipitated calcium carbonate. Alternatively, the precipitated calcium carbonate comprises, preferably consists of, two or more kinds of precipitated calcium carbonate(s). For example, the precipitated calcium carbonate comprises, preferably consists of, two or three kinds of precipitated calcium carbonates. Preferably, the precipitated calcium carbonate comprises, more preferably consists of, one kind of precipitated calcium carbonate.

According to one embodiment, the precipitated calcium carbonate is selected from the group consisting of precipitated calcium carbonates having an aragonitic, vateritic or calcitic crystal form, and mixtures thereof.

It is appreciated that the precipitated calcium carbonate may have specific physical characteristics such as a specific particle size or a specific surface area.

According to one embodiment, the precipitated calcium carbonate has a volume median particle size d50 from 0.1 to 50 μm, preferably from 0.5 to 40 μm, more preferably from 0.5 to 20 μm, even more preferably from 0.5 to 10 μm, and most preferably from 0.8 to 8 μm.

According to another embodiment, the precipitated calcium carbonate has a volume median particle size d50 from 0.25 to 50 μm, more preferably from 0.3 to 10 μm, and most preferably from 0.4 to 7 μm. In one embodiment, the precipitated calcium carbonate has a volume top cut particle size d98 of from 1 to 100 μm, preferably of from 1 to 50 μm, more preferably of from 1.5 to 30 μm, and most preferably of from 1.5 to 20 μm. According to another embodiment, the precipitated calcium carbonate has a volume median particle size d50 from 0.3 to 10 μm, and most preferably from 0.4 to 7 μm and a volume top cut particle size d98 of from 1.5 to 30 μm, and most preferably of from 1.5 to 20 μm.

According to another embodiment, the precipitated calcium carbonate has a specific surface area of from 3 m2/g to 50 m2/g, preferably from 3 m2/g to 35 m2/g, most preferably from 3 m2/g to 25 m2/g measured using nitrogen and the BET method.

According to another embodiment, the precipitated calcium carbonate has a volume median particle size d50 from 0.3 to 10 μm, and most preferably from 0.4 to 7 μm and a volume top cut particle size d98 of from 1.5 to 30 μm, and most preferably of from 1.5 to 20 μm, and a specific surface area of from 3 m2/g to 50 m2/g, preferably from 3 m2/g to 35 m2/g, most preferably from 4 m2/g to 25 m2/g measured using nitrogen and the BET method.

The calcium carbonate-based composition comprises a second component. The second component is a surface-reacted calcium carbonate, wherein the surface-reacted calcium carbonate is a reaction product of natural ground calcium carbonate or precipitated calcium carbonate with carbon dioxide and at least one H3O+ ion donor, wherein the carbon dioxide is formed in situ by the at least one H3O+ ion donor treatment and/or is supplied from an external source.

According to one embodiment, the surface-reacted calcium carbonate is a reaction product of natural ground calcium carbonate selected from the group consisting of marble, chalk, limestone, and mixtures thereof, with carbon dioxide and at least one H3O+ ion donor, wherein the carbon dioxide is formed in situ by the at least one H3O+ ion donor treatment and/or is supplied from an external source, or the surface-reacted calcium carbonate is a reaction product of precipitated calcium carbonate selected from the group consisting of precipitated calcium carbonates having an aragonitic, vateritic or calcitic crystal form, and mixtures thereof, with carbon dioxide and at least one H3O+ ion donor, wherein the carbon dioxide is formed in situ by the at least one H3O+ ion donor treatment and/or is supplied from an external source.

According to one preferred embodiment, the surface-reacted calcium carbonate is a reaction product of natural ground calcium carbonate selected from the group consisting of marble, chalk, limestone, and mixtures thereof, with carbon dioxide and at least one H3O+ ion donor, wherein the carbon dioxide is formed in situ by the at least one H3O+ ion donor treatment and/or is supplied from an external source.

The second component of the calcium carbonate-based composition can have a specific residual moisture content. According to one embodiment, the second component has a residual moisture content of below 10 wt. %, preferably of below 5.0 wt. %, based on the total weight of the second component. For example, the residual moisture may be around 3.0 wt. %, based on the total weight of the second component.

It is appreciated that the surface-reacted calcium carbonate can be one or a mixture of different kinds of surface-reacted calcium carbonate(s).

In one embodiment of the present invention, the surface-reacted calcium carbonate comprises, preferably consists of, one kind of surface-reacted calcium carbonate. Alternatively, the surface-reacted calcium carbonate comprises, preferably consists of, two or more kinds of surface-reacted calcium carbonates. For example, the surface-reacted calcium carbonate comprises, preferably consists of, two or three kinds of surface-reacted calcium carbonates. Preferably, the surface-reacted calcium carbonate comprises, more preferably consists of, one kind of surface-reacted calcium carbonate.

In a preferred embodiment of the invention the surface-reacted calcium carbonate is obtained by a process comprising the steps of: (a) providing a suspension of natural or precipitated calcium carbonate, (b) adding at least one acid having a pKa value of 0 or less at 20° C. or having a pKa value from 0 to 2.5 at 20° C. to the suspension of step a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous CO2, (D) contacting said natural or precipitated calcium carbonate of step (A) with the at least one acid of step (B) and with the CO2 of step (C), characterised in that: (i) the at least one acid of step B) has a pKa of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a pKa of greater than 7 at 20° C., associated with the ionisation of the first available hydrogen, and the salt anion of which is capable of forming water-insoluble calcium salts, is additionally provided.

Natural ground calcium carbonate (GCC) preferably is selected from calcium carbonate containing minerals selected from the group comprising marble, chalk, limestone and mixtures thereof. Natural ground calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example CaCl2 and Na2CO3, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one H3O+ ion donor by the same means as used for grinding natural calcium carbonate as described above.

According to one embodiment of the present invention, the natural ground calcium carbonate or precipitated calcium carbonate is in form of particles having a weight median particle size d50 of 0.05 to 10.0 μm, preferably 0.2 to 5.0 μm, and most preferably 0.4 to 3.0 μm. According to a further embodiment of the present invention, the natural ground calcium carbonate or precipitated calcium carbonate is in form of particles having a weight top cut particle size d98 of 0.15 to 30 μm, preferably 0.6 to 15 μm, more preferably 1.2 to 10 μm, most preferably 1.5 to 4 μm, especially 1.6 μm.

The natural ground calcium carbonate and/or precipitated calcium carbonate may be used dry or suspended in water. Preferably, a corresponding slurry has a content of natural ground calcium carbonate or precipitated calcium carbonate with from 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more H3O+ ion donor used for the preparation of surface-reacted calcium carbonate may be any strong acid, medium-strong acid, or weak acid, or mixtures thereof, generating H3O+ ions under the preparation conditions. According to the present invention, the at least one H3O+ ion donor can also be an acid salt, generating H3O+ ions under the preparation conditions.

According to one embodiment, the at least one H3O+ ion donor is a strong acid having a pKa of 0 or less at 20° C.

According to another embodiment, the at least one H3O+ ion donor is a medium-strong acid having a pKa value from 0 to 2.5 at 20° C. If the pKa at 20° C. is 0 or less, the acid is preferably selected from sulphuric acid, hydrochloric acid, or mixtures thereof. If the pKa at 20° C. is from 0 to 2.5, the H3O+ ion donor is preferably selected from H2SO3, H3PO4, oxalic acid, or mixtures thereof. The at least one H3O+ ion donor can also be an acid salt, for example, HSO4− or H2PO4−, being at least partially neutralized by a corresponding cation such as Li+, Na+ or K+, or HPO42−, being at least partially neutralised by a corresponding cation such as Li+, Na+, K+, Mg2+ or Ca2+. The at least one H3O+ ion donor can also be a mixture of one or more acids and one or more acid salts.

According to still another embodiment, the at least one H3O+ ion donor is a weak acid having a pKa value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a pKa of greater than 7, when measured at 20° C., associated with the ionisation of the first available hydrogen, and the salt anion of which is capable of forming water-insoluble calcium salts, is additionally provided. According to the preferred embodiment, the weak acid has a pKa value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one H3O+ ion donor is selected from the group consisting of hydrochloric acid, sulphuric acid, sulphurous acid, phosphoric acid, citric acid, oxalic acid, acetic acid, formic acid, and mixtures thereof. Preferably the at least one H3O+ ion donor is selected from the group consisting of hydrochloric acid, sulphuric acid, sulphurous acid, phosphoric acid, oxalic acid, H2PO4−, being at least partially neutralised by a corresponding cation such as Li+, Na+ or K+, HPO42−, being at least partially neutralised by a corresponding cation such as Li+, Na+, K+, Mg2+, or Ca2+ and mixtures thereof, more preferably the at least one acid is selected from the group consisting of hydrochloric acid, sulphuric acid, sulphurous acid, phosphoric acid, oxalic acid, or mixtures thereof, and most preferably, the at least one H3O+ ion donor is phosphoric acid.

The one or more H3O+ ion donor can be added to the suspension as a concentrated solution or a more diluted solution. Preferably, the molar ratio of the H3O+ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the H3O+ ion donor to the water before the natural or precipitated calcium carbonate is suspended.

In a next step, the natural ground calcium carbonate or precipitated calcium carbonate is treated with carbon dioxide. If a strong acid such as sulphuric acid or hydrochloric acid is used for the H3O+ ion donor treatment of the natural ground calcium carbonate or precipitated calcium carbonate, the carbon dioxide is automatically formed. Alternatively or additionally, the carbon dioxide can be supplied from an external source.

H3O+ ion donor treatment and treatment with carbon dioxide can be carried out simultaneously which is the case when a strong or medium-strong acid is used. It is also possible to carry out H3O+ ion donor treatment first, e.g. with a medium strong acid having a pKa from 0 to 2.5 at 20° C., wherein carbon dioxide is formed in situ, and thus, the carbon dioxide treatment will automatically be carried out simultaneously with the H3O+ ion donor treatment, followed by the additional treatment with carbon dioxide supplied from an external source.

In a preferred embodiment, the H3O+ ion donor treatment step and/or the carbon dioxide treatment step are repeated at least once, more preferably several times. According to one embodiment, the at least one H3O+ ion donor is added over a time period of at least about 5 min, typically from about 5 to about 30 min. Alternatively, the at least one H3O+ ion donor is added over a time period of about 30 min, preferably about 45 min, and sometimes about 1 h or more.

Subsequent to the H3O+ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

It is appreciated that the H3O+ ion donor treatment and treatment with carbon dioxide can be carried over a wide temperature range. Preferably, the H3O+ ion donor treatment and treatment with carbon dioxide can be carried out at room temperature or elevated temperature. For example, if the H3O+ ion donor treatment and treatment with carbon dioxide is carried out at elevated temperature, the treatment is preferably in a range from 30 to 90° C., more preferably from 40 to 80° C. and most preferably from 50 to 80° C., such as from 60 to 80° C.

Further details about the preparation of the surface-reacted natural calcium carbonate are disclosed in WO00/39222 A1, WO2004/083316 A1, WO2005/121257 A2, WO2009/074492 A1, EP2264108 A1, EP2264109 A1 and US2004/0020410 A1, the content of these references herewith being included in the present application.

Similarly, surface-reacted precipitated calcium carbonate is obtained. As can be taken in detail from WO2009/074492 A1, surface-reacted precipitated calcium carbonate is obtained by contacting precipitated calcium carbonate with H3O+ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H3O+$ ions, where said $H3O+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H3O+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural ground calcium carbonate or precipitated calcium carbonate, the natural ground calcium carbonate or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metallic silicate. These components can be added to an aqueous suspension comprising the natural ground calcium carbonate or precipitated calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural ground calcium carbonate or precipitated calcium carbonate in the form of granules or a powder.

The surface-reacted calcium carbonate may have different particle shapes, such as e.g. the shape of roses, golf balls and/or brains.

According to one embodiment, the surface-reacted calcium carbonate has a specific surface area of from 15 m2/g to 200 m2/g, preferably from 20 m2/g to 180 m2/g, more preferably from 25 m2/g to 160 m2/g, and most preferably from 70 m2/g to 120 m2/g measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in m2/g.

It has surprisingly been found by the inventors that the use of a surface-reacted calcium carbonate having a specific surface area from 70 m2/g to 120 m2/g as the second component of the calcium carbonate-based composition leads to a further improved anticaking effect and/or improvement of flow properties.

According to one embodiment the surface-reacted calcium carbonate has a volume median particle size d50 from 0.1 to 75 μm, preferably from 0.5 to 50 μm, more preferably from 1 to 40 μm, even more preferably from 1.2 to 30 μm, even more preferably from 1.5 to 15 μm, and most preferably from 3 to 10 μm.

It may furthermore be preferred that the surface-reacted calcium carbonate particles have a volume top cut particle size d98 of from 2 to 150 μm, preferably from 4 to 100 μm, more preferably 6 to 80 μm, even more preferably from 8 to 60 μm, even more preferably from 8 to 30 μm, and most preferably from 12 to 25 μm.

The value dx represents the diameter relative to which x % of the particles have diameters less than dx. This means that the d98 value is the particle size at which 98% of all particles are smaller. The d98 value is also designated as "top cut". The dx values may be given in volume or weight percent. The d50(wt) value is thus the weight median particle size, i.e. 50 wt.-% of all grains are smaller than this particle size, and the d50 (vol) value is the volume median particle size, i.e. 50 vol. % of all grains are smaller than this particle size.

Volume median grain diameter d50 was evaluated using a Malvern Mastersizer 2000 Laser Diffraction System or a Malvern Mastersizer 3000 Laser Diffraction System. The d50 or d98 value, measured using a Malvern Mastersizer 2000 Laser Diffraction System or a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005. The measurements were carried out in an aqueous solution of 0.1 wt.-% Na4P2O7.

The weight median grain diameter is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt.-% Na4P2O7. The samples were dispersed using a high speed stirrer and sonicated.

The processes and instruments are known to the skilled person and are commonly used to determine grain size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 5 cm3 chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 cm3/g, more preferably from 0.2 to 2.0 cm3/g, especially preferably from 0.4 to 1.8 cm3/g and most preferably from 0.6 to 1.6 cm3/g, calculated from mercury porosimetry measurement.

The intra-particle pore size of the surface-reacted calcium carbonate preferably is in a range of from 0.004 to 1.6 μm, more preferably in a range of between 0.005 to 1.3 μm, especially preferably from 0.006 to 1.15 μm and most preferably of 0.007 to 1.0 μm, e.g. 0.004 to 0.16 μm determined by mercury porosimetry measurement.

According to an exemplary embodiment, the surface-reacted calcium carbonate has a volume median particle size d50 from 1.5 to 15 μm, preferably from 4 to 8 μm; a specific surface-area of from 30 to 140 m2/g, preferably from 30 to 90 m2/g, measured using nitrogen and the BET method; and an intra-particle intruded specific pore volume from 0.2 to 2.0 cm3/g, preferably from 0.6 to 1.6 cm3/g, calculated from mercury porosimetry measurement.

According to another exemplary embodiment, the surface-reacted calcium carbonate has a volume median particle size d50 from 5 to 9 μm; a specific surface-area of from 45 to 85 m2/g, measured using nitrogen and the BET method; and a volume top cut particle size d98 of from 13 to 20 μm.

Due to the intra and interpore structure of the surface-reacted calcium carbonate, it can be a superior agent to deliver previously adsorbed and/or absorbed materials over time relative to common materials having similar specific surface areas. Thus, generally, any agent fitting into the intra- and/or inter particle pores of the surface-reacted calcium carbonate is suitable to be transported by the surface-reacted calcium carbonate according to the invention. For example, active agents such as those selected from the group comprising pharmaceutically active agents, biologically active agents, disinfecting agents, preservatives, flavouring agents, surfactants, oils, fragrances, essential oils, and mixtures thereof can be used. According to one embodiment, at least one active agent is associated with the surface-reacted calcium carbonate.

According to one embodiment of the present invention, the surface-reacted calcium carbonate comprises an water-insoluble, at least partially crystalline calcium salt of an anion of the at least one acid, which is formed on the surface of the natural ground calcium carbonate or precipitated calcium carbonate. According to one embodiment, the water-insoluble, at least partially crystalline salt of an anion of the at least one acid covers the surface of the natural ground calcium carbonate or precipitated calcium carbonate at least partially, preferably completely. Depending on the employed at least one acid, the anion may be sulphate, sulphite, phosphate, citrate, oxalate, acetate, formiate and/or chloride.

According to one embodiment the surface-reacted calcium carbonate comprises:

(i) a specific surface area of from 15 to 200 $m^2$/g measured using nitrogen and the BET method according to ISO 9277:2010, and (ii) an intra-particle intruded specific pore volume from 0.1 to 2.3 $cm^3$/g calculated from mercury porosimetry measurement.

According to one embodiment, the second component has a volume median particle size d50 from 0.5 to 50 μm, preferably from 1 to 40 μm, more preferably from 1.2 to 30 μm, and even more preferably from 1.5 to 15 μm, and most preferably from 3 to 10 μm, and/or the second component has a specific surface area of from 15 m2/g to 200 m2/g, preferably from 20 m2/g to 180 m2/g, more preferably from 25 m2/g to 160 m2/g, and most preferably from 70 m2/g to 120 m2/g, measured using nitrogen and the BET method.

According to one embodiment, the second component has a volume median particle size d50 from 0.5 to 50 μm, preferably from 1 to 40 μm, more preferably from 1.2 to 30 μm, and even more preferably from 1.5 to 15 μm, and most preferably from 3 to 10 μm, and the second component has a specific surface area of from 15 m2/g to 200 m2/g, preferably from 20 m2/g to 180 m2/g, more preferably from 25 m2/g to 160 m2/g, and most preferably from 70 m2/g to 120 m2/g, measured using nitrogen and the BET method.

According to one preferred embodiment, the second component being a surface-reacted calcium carbonate has a specific surface area of from 20 m2/g to 180 m2/g, preferably from 25 m2/g to 160 m2/g, and most preferably from 70 m2/g to 120 m2/g measured using nitrogen and the BET method, a volume median particle size d50 from 1.2 to 30 μm, preferably from 1.5 to 15 μm, and most preferably from 3 to 10 μm, and a volume top cut particle size d98 of from 8 to 60 μm, even more preferably from 8 to 30 μm, and most preferably from 12 to 25 μm.

According to one preferred embodiment, the second component being a surface-reacted calcium carbonate has a specific surface area of from 20 m2/g to 180 m2/g, preferably from 25 m2/g to 160 m2/g, and most preferably from 90 m2/g to 120 m2/g measured using nitrogen and the BET method, a volume median particle size d50 from 1.2 to 30 μm, preferably from 1.5 to 15 μm, and most preferably from 3 to 10 μm, and a volume top cut particle size d98 of from 8 to 60 μm, even more preferably from 8 to 30 μm, and most preferably from 12 to 25 μm.

According to a preferred embodiment, the calcium carbonate-based composition comprises a first component being a natural ground calcium carbonate, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source.

According to a preferred embodiment, the calcium carbonate-based composition comprises a first component being a natural ground calcium carbonate having a volume median particle size $d_{50}$ from 0.1 to 50 μm, preferably from 0.5 to 40 μm, more preferably from 0.5 to 20 μm, even more preferably from 0.5 to 10 μm, and most preferably from 0.8 to 8 μm, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the surface-reacted calcium carbonate has a volume median particle size $d_{50}$ from 0.5 to 50 μm, preferably from 1 to 40 μm, more preferably from 1.2 to 30 μm, and even more preferably from 1.5 to 15 μm, and most preferably from 3 to 10 μm.

According to a preferred embodiment, the calcium carbonate-based composition comprises a first component being a natural ground calcium carbonate having a volume median particle size $d_{50}$ from 0.1 to 50 μm, preferably from 0.5 to 40 μm, more preferably from 0.5 to 20 μm, even more preferably from 0.5 to 10 μm, and most preferably from 0.8 to 8 μm, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the surface-reacted calcium carbonate has a volume median particle size $d_{50}$ from 0.5 to 50 μm, preferably from 1 to 40 μm, more preferably from 1.2 to 30 μm, and even more preferably from 1.5 to 15 μm, and most preferably from 3 to 10 μm, and wherein the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof, preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a cation selected from $Li^+$, $Na^+$ and/or $K^+$, $HPO_4^{2-}$, being at least partially neutralised by a cation selected from $Li^+$, $Na^+$, $K^+$, $Mg^{2+}$, and/or $Ca^{2+}$, and mixtures thereof, more preferably the at least one $H_3O^+$ ion donor is selected from the group consisting of hydrochloric acid, sulphuric acid, sulphurous acid, phosphoric acid, oxalic acid, or mixtures thereof, and most preferably the at least one $H_3O^+$ ion donor is phosphoric acid.

According to a preferred embodiment, the calcium carbonate-based composition comprises a first component being a natural ground calcium carbonate having a volume median particle size $d_{50}$ from 0.5 to 10 μm, and preferably from 0.8 to 8 μm, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the surface-reacted calcium carbonate has a volume median particle size $d_{50}$ from 1.5 to 15 μm, and preferably from 3 to 10 μm, and wherein the at least one $H_3O^+$ ion donor is selected from the group consisting of hydrochloric acid, sulphuric acid, sulphurous acid, phosphoric acid, oxalic acid, or mixtures thereof, and preferably the at least one $H_3O^+$ ion donor is phosphoric acid.

The first component and the second component can be present in the calcium carbonate-based composition in specific overall amounts.

According to one preferred embodiment, the first component and the second component are present in the calcium carbonate-based composition in an amount in the range of 80 to 100 wt. %, more preferably from 90 to 100 wt. %, even more preferably from 95 to 100 wt. %, and most preferably from 98 to 100 wt. %, based on the total weight of the calcium carbonate-based composition.

According to one preferred embodiment, the calcium carbonate-based composition consists of the first component and the second component.

Furthermore, the first component and the second component can be present in the calcium carbonate-based composition in specific weight ratios.

According to one preferred embodiment, the weight ratio of the first component to the second component is in the range of 99:1 to 1:99, preferably in the range of 95:5 to 10:90, even more preferably in the range of 90:10 to 20:80, even more preferably in the range of 85:15 to 30:70, and most preferably in the range of 80:20 to 40:60.

According to one preferred embodiment, the weight ratio of the first component to the second component in the range of 85:15 to 40:60, and most preferably in the range of 80:20 to 50:50.

According to another preferred embodiment, the weight ratio of the first component to the second component is in the range of 98:2 to 2:98, preferably in the range of 95:5 to 5:95, even more preferably in the range of 90:10 to 10:90, even more preferably in the range of 85:15 to 15:85, even most preferably in the range of 80:20 to 20:80.

According to one preferred embodiment, the weight ratio of the first component to the second component is in the range of 85:15 to 30:70. According to a more preferred embodiment, the weight ratio of the first component to the second component is in the range of 80:20 to 40:60.

The inventors surprisingly found that the anticaking effect provided by the calcium carbonate-based composition is particularly pronounced when the first component and the second component is used in specific weight ratios as shown above.

According to a preferred embodiment, the calcium carbonate-based composition comprises, preferably consists of, a first component being a natural ground calcium carbonate, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the weight ratio of the first component to the second component is in the range of 98:2 to 2:98, preferably in the range of 95:5 to 5:95, even more preferably in the range of 90:10 to 10:90, even more preferably in the range of 85:15 to 15:85, most preferably in the range of 80:20 to 20:80.

According to a preferred embodiment, the calcium carbonate-based composition comprises, preferably consists of, a first component being a natural ground calcium carbonate having a volume median particle size $d_{50}$ from 0.1 to 50 μm, preferably from 0.5 to 40 μm, more preferably from 0.5 to 20 μm, even more preferably from 0.5 to 10 μm, and most preferably from 0.8 to 8 μm, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the surface-reacted calcium carbonate has a volume median particle size $d_{50}$ from 0.5 to 50 μm, preferably from 1 to 40 μm, more preferably from 1.2 to 30 μm, and even more preferably from 1.5 to 15 μm, and most preferably from 3 to 10 μm, and wherein the weight ratio of the first component to the second component is in the range of 98:2 to 2:98, preferably in the range of 95:5 to 5:95, even more preferably in the range of 90:10 to 10:90, even more preferably in the range of 85:15 to 15:85, most preferably in the range of 80:20 to 20:80.

The calcium carbonate-based composition can have a specific volume-based particle size distribution.

According to one embodiment, the volume-based particle size distribution is multimodal, preferably bimodal.

The inventors found that using a calcium carbonate-based composition having a multimodal particle size distribution is advantageous over e.g. using a calcium carbonate-based composition having a monomodal particle size distribution.

According to one embodiment, the calcium carbonate-based composition has a volume based median particle size d50 in the range of from 0.5 to 50 μm, preferably from 1 to 40 μm, more preferably from 1.2 to 30 μm, and even more preferably from 1.5 to 15 μm, and most preferably from 3 to 10 μm.

According to one embodiment, the calcium carbonate-based composition has a volume top cut particle size d98 of from 2 to 80 μm, preferably of from 4 to 60 μm, even more preferably from 8 to 30 μm, and most preferably from 12 to 25 μm.

According to one embodiment, the calcium carbonate-based composition has a volume based median particle size d50 in the range of from 0.5 to 50 μm, preferably from 1 to 40 μm, more preferably from 1.2 to 30 μm, and even more preferably from 1.5 to 15 μm, and most preferably from 3 to 10 μm, and a volume top cut particle size d98 of from 2 to 80 μm, preferably of from 4 to 60 μm, even more preferably from 8 to 30 μm, and most preferably from 12 to 25 μm.

According to one embodiment, the calcium carbonate-based composition is a solid composition.

It is further preferred that the calcium carbonate-based composition has a specific residual moisture content.

According to one preferred embodiment, the calcium carbonate-based composition has a residual moisture of less than 10.0 wt. %, preferably less than 7.5 wt. %, and more preferably less than 5.0 wt. %, based on the total weight of the calcium carbonate-based composition.

The use of the calcium carbonate-based composition as anticaking agent is principally not limited to specific base components, i.e. particulate compositions to which the anticaking agent is added.

According to one embodiment, the calcium carbonate-based composition is added as an anti-caking agent to a base component.

Suitable base components are for example food compositions, feed compositions, nutraceutical compositions, pharmaceutical compositions and cosmetic compositions. According to one embodiment, the calcium carbonate-based composition is added as an anti-caking agent to a base component selected from the group consisting of a food composition, a feed composition, a nutraceutical composition, a pharmaceutical composition and a cosmetic composition, and preferably the composition is selected from a food composition or a feed composition.

Preferably, the food composition is a food salt, a curing salt, a salt substitute, a milk powder, a skimmed milk powder, a cream powder, an egg powder, a whey fat powder, a protein powder, a vending machine powder, a grated cheese, a sugar, a powdered food flavour, a spice, a seasoning, a packet soup mixture, a baking mixture, a pudding powder, a mousse powder, or a sauce powder.

Preferably, the feed composition is pet food, milk replacer for animals, or mineral salt for animals.

Preferably, the pharmaceutical composition is a pharmaceutical composition provided in a dosage form of a powder or granules.

Preferably, the cosmetic composition is a cosmetic powder such as eyeshadow, powder makeup, lip powder, face powder, body powder or blusher.

Preferably, the nutraceutical composition is a food additive or a food supplement such as vitamins, herbs, minerals, enzyme powders, amino acid powders, protein powders or salts.

The base component may have a specific particle size distribution. According to one embodiment, the base component has a volume-median particle size d50 in the range of from 1 μm to 10 mm, preferably from 5 μm to 5 mm, more preferably from 10 μm to 1 mm, even more preferably from 20 μm to 500 μm, and most preferably from 20 μm to 100 μm.

According to one preferred embodiment, the base component is a food composition or a feed composition, preferably a food composition, having a volume-median particle size d50 in the range of from 1 μm to 10 mm, preferably from 5 μm to 5 mm, more preferably from 10 μm to 1 mm, even more preferably from 20 μm to 500 μm, and most preferably from 20 μm to 100 μm.

According to one preferred embodiment, the base component is a milk powder having a volume-median particle size d50 in the range of from 10 μm to 1 mm, preferably from 20 μm to 500 μm, and most preferably from 20 μm to 100 μm.

Furthermore, the calcium carbonate-based composition may be added to a base component as an anticaking agent in specific amounts.

According to one embodiment, the calcium carbonate-based composition is added to a base component in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the base component and the calcium carbonate-based composition.

According to one preferred embodiment, the calcium carbonate-based composition is added to a base component in an amount from 0.1 to 10 wt. %, preferably in an amount from 0.2 to 5 wt. %, and most preferably in an amount from 0.3 to 2.5 wt. %, based on the total weight of the base component and the calcium carbonate-based composition. Most preferably, the calcium carbonate-based composition is added to a base component in an amount from 0.3 to 2.5 wt. % (e.g. 1.0 wt. %), based on the total weight of the base component and the calcium carbonate-based composition.

According to one preferred embodiment, the calcium carbonate-based composition is added to a base component in an amount from 0.1 to 10 wt. %, preferably in an amount from 0.2 to 5 wt. %, and most preferably in an amount from 0.3 to 2.5 wt. %, based on the total weight of the base component and the calcium carbonate-based composition, wherein the base component is a food composition or a feed composition. Most preferably, the calcium carbonate-based composition is added to a base component in an amount from 0.3 to 2.5 wt. % (e.g. 1.0 wt. %), based on the total weight of the base component and the calcium carbonate-based composition, wherein the base component is a food composition or a feed composition.

Another embodiment of the present invention refers to a method for reducing or preventing caking of a particulate composition,

- the method comprising the step of adding a calcium carbonate-based composition to a base component,
- wherein the calcium carbonate-based composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source.

Preferred embodiments (e.g. preferred embodiments of the calcium carbonate-based composition, its first component, its second component, the base component etc.) of the method for reducing or preventing the caking of a particulate composition are described above.

The Particulate Composition

Another aspect of the present invention refers to a particulate composition comprising a calcium carbonate-based anticaking composition and a base component,

- wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source,
- wherein the particulate composition comprises the calcium carbonate-based anticaking composition in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition.

According to one preferred embodiment, the particulate composition is a solid composition. According to one preferred embodiment, the particulate composition is a dry solid composition. According to one preferred embodiment, the particulate composition is a dry solid composition, wherein the dry solid composition contains less than 20.0 wt. %, preferably less than 10 wt. %, more preferably less than 7.5 wt. %, of residual moisture, based on the total weight of the particulate composition.

The particulate composition according to the invention comprises a calcium carbonate-based anticaking composition and a base component. Preferably, the particulate composition consists of a calcium carbonate-based anticaking composition and a base component.

It is to be understood that the calcium carbonate-based anticaking composition corresponds to the calcium carbonate-based composition for use as anticaking agent as described above. Preferred embodiments of the calcium carbonate-based anticaking composition, its first component and its second component are described in the foregoing section.

The particulate composition according to the present invention comprises a base component.

Suitable base components are for example food compositions, feed compositions, nutraceutical compositions, pharmaceutical compositions and cosmetic compositions. According to one preferred embodiment, the base component is selected from the group consisting of a food composition, a feed composition, a nutraceutical composition, a pharmaceutical composition and a cosmetic composition, and preferably is a food composition or a feed composition.

Preferably, the food composition is a food salt, a curing salt, a salt substitute, a milk powder, a skimmed milk powder, a cream powder, an egg powder, a whey fat powder, a protein powder, a vending machine powder, a grated cheese, a sugar, a powdered food flavour, a spice, a seasoning, a packet soup mixture, a baking mixture, a pudding powder, a mousse powder, or a sauce powder.

Preferably, the feed composition is pet food, milk replacer for animals, or mineral salt for animals.

Preferably, the pharmaceutical composition is a pharmaceutical composition provided in a dosage form of a powder or granules.

Preferably, the cosmetic composition is a cosmetic powder such as eyeshadow, powder makeup, lip powder, face powder, body powder or blusher.

Preferably, the nutraceutical composition is a food additive or a food supplement such as vitamins, herbs, minerals, enzyme powders, amino acid powders, protein powders or salts.

The base component may have a specific particle size distribution. According to one embodiment, the base component has a volume-median particle size d50 in the range of from 1 μm to 10 mm, preferably from 5 μm to 5 mm, more preferably from 10 μm to 1 mm, even more preferably from 20 μm to 500 μm, and most preferably from 20 μm to 100 μm.

According to one preferred embodiment, the base component is a food composition or a feed composition, preferably a food composition, having a volume-median particle size d50 in the range of from 1 μm to 10 mm, preferably from 5 μm to 5 mm, more preferably from 10 μm to 1 mm, even more preferably from 20 μm to 500 μm, and most preferably from 20 μm to 100 μm.

According to one preferred embodiment, the base component is a milk powder having a volume-median particle size d50 in the range of from 10 μm to 1 mm, preferably from 20 μm to 500 μm, and most preferably from 20 μm to 100 μm.

The particulate composition according to the invention comprises the calcium carbonate-based anticaking composition in an amount of from 0.1 to 50 wt. %.

According to a preferred embodiment, the particulate composition comprises the calcium carbonate-based anticaking composition in an amount from 0.1 to 20 wt. %, preferably in an amount from 0.1 to 10 wt. %, even more preferably in an amount from 0.2 to 5 wt. %, and most preferably in an amount from 0.3 to 2.5 wt. %, based on the total weight of the particulate composition.

According to one embodiment, the particulate composition comprises the calcium carbonate-based anticaking composition in an amount from 0.2 to 5 wt. %, based on the total weight of the particulate composition.

According to one embodiment, the particulate composition comprises the calcium carbonate-based anticaking composition in an amount from 0.3 to 2.5 wt. % (e.g. 1.0 wt. %), based on the total weight of the particulate composition.

According to one preferred embodiment, the particulate composition comprises a calcium carbonate-based anticaking composition and a base component, wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source, wherein the particulate composition comprises the calcium carbonate-based anticaking composition in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition.

wherein the first component and the second component are present in the calcium carbonate-based anticaking composition in an amount in the range of 80 to 100 wt. %, more preferably from 90 to 100 wt. %, even more preferably from 95 to 100 wt. %, and most preferably from 98 to 100 wt. %, based on the total weight of the calcium carbonate-based anticaking composition, and/or wherein the weight ratio of the first component to the second component in the calcium carbonate-based anticaking composition is in the range of 99:1 to 1:99, preferably in the range of 95:5 to 20:80, even more preferably in the range of 90:10 to 30:70, even more preferably in the range of 85:15 to 40:60, and most preferably in the range of 80:20 to 50:50.

According to one preferred embodiment, the particulate composition comprises a calcium carbonate-based anticaking composition and a base component, wherein the calcium carbonate-based anticaking composition consists of a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source, wherein the particulate composition comprises the calcium carbonate-based anticaking composition in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition, and wherein the weight ratio of the first component to the second component in the calcium carbonate-based anticaking composition is in the range of 99:1 to 1:99, preferably in the range of 95:5 to 20:80, even more preferably in the range of 90:10 to 30:70, even more preferably in the range of 85:15 to 40:60, and most preferably in the range of 80:20 to 50:50.

According to one preferred embodiment, the particulate composition comprises a calcium carbonate-based anticaking composition and a base component, wherein the calcium carbonate-based anticaking composition consists of a first component being a natural ground calcium carbonate, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the particulate composition comprises the calcium carbonate-based anticaking composition in an amount from 0.1 to 10 wt. %, even more preferably in an amount from 0.2 to 5 wt. %, and most preferably in an amount from 0.3 to 2.5 wt. %, based on the total weight of the particulate composition.

wherein the weight ratio of the first component to the second component in the calcium carbonate-based anticaking composition is in the range of 99:1 to 1:99, preferably in the range of 95:5 to 20:80, even more preferably in the range of 90:10 to 30:70, even more preferably in the range of 85:15 to 40:60, and most preferably in the range of 80:20 to 50:50.

According to one preferred embodiment, the particulate composition comprises, preferably consists of, a calcium carbonate-based anticaking composition and a base component, wherein the base component is a food composition or a feed composition, wherein the calcium carbonate-based anticaking composition consists of a first component being a natural ground calcium carbonate, and a second component being a surface-reacted calcium carbonate, wherein the surface-reacted calcium carbonate is a reaction product of natural ground calcium carbonate with carbon dioxide and at least one $H_3O^+$ ion donor, wherein the carbon dioxide is formed in situ by the at least one $H_3O^+$ ion donor treatment and/or is supplied from an external source, wherein the particulate composition comprises the calcium carbonate-based anticaking composition in an amount from 0.2 to 5 wt. %, and most preferably in an amount from 0.3 to 2.5 wt. %, based on the total weight of the particulate composition.

and wherein the weight ratio of the first component to the second component in the calcium carbonate-based anti-caking composition is in the range of 90:10 to 30:70, even more preferably in the range of 85:15 to 40:60, and most preferably in the range of 80:20 to 50:50.

Method for Producing the Particulate Composition

Another aspect of the present invention refers to a method for the production of a particulate composition, the method comprising the step of mixing a calcium carbonate-based anticaking composition with a base component, wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O^+$ ion donor treatment and/or is supplied from an external source, and wherein the calcium carbonate-based anticaking composition is admixed into the base component in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition.

According to one embodiment, the calcium carbonate-based anticaking composition and/or the base component is provided in solid form.

According to a preferred embodiment, the calcium carbonate-based anticaking composition and the base component are provided in solid form.

Preferably, the calcium carbonate-based anticaking composition and/or the base component is provided in dry form. According to one embodiment, the calcium carbonate-based anticaking composition and/or the base component is provided in dry form, wherein the calcium carbonate-based anticaking composition and/or the base component has a residual moisture content of below 10 wt. %, preferably below 8 wt. %.

According to one embodiment, the calcium carbonate-based anticaking composition and the base component are provided in dry form, wherein the calcium carbonate-based anticaking composition and/or the base component has a residual moisture content of below 10 wt. %, preferably below 8 wt. %.

The mixing step is preferably a dry blending step. Preferably, the dry blending step is carried out with a plough share mixer, a ribbon mixer or a cone single shaft mixer. The skilled person is familiar with such type of mixers and mixing processes.

According to a preferred embodiment, the method comprises the steps of providing a calcium carbonate-based anticaking composition in solid form, preferably dry form, and a base component in solid form, preferably dry form, mixing the calcium carbonate-based anticaking composition with the base component, wherein the mixing is a dry blending step.

The method may comprise further steps such as packaging the obtained particulate composition. Thus, according to one embodiment, the method comprises the steps of providing a calcium carbonate-based anticaking composition in solid form, preferably dry form, and a base component in solid form, preferably dry form, mixing the calcium carbonate-based anticaking composition with the base component, wherein the mixing is a dry blending step, and packaging the obtained particulate composition.

The calcium carbonate-based anticaking composition is admixed into the base component in an amount of from 0.1 to 50 wt. %, preferably in an amount from 0.1 to 20 wt. %, more preferably in an amount from 0.1 to 10 wt. %, even more preferably in an amount from 0.2 to 5 wt. %, and most preferably in an amount from 0.3 to 2.5 wt. %, based on the total weight of the particulate composition.

In a preferred embodiment, the calcium carbonate-based anticaking composition is admixed into the base component in an amount from 0.1 to 10 wt. %, even more preferably in an amount from 0.2 to 5 wt. %, and most preferably in an amount from 0.3 to 2.5 wt. %, based on the total weight of the particulate composition.

In a preferred embodiment, the calcium carbonate-based anticaking composition is admixed into the base component in an amount from 0.3 to 2.5 wt. % (e.g. 1.0 wt. %), based on the total weight of the particulate composition.

FIGURES

FIG. 1: Normalized basic flow energy (BFEnorm) measured for milk protein containing no additives, milk powder containing ground calcium carbonate or surface-reacted calcium carbonate and milk powder containing the inventive anticaking agent.

Figure 2:
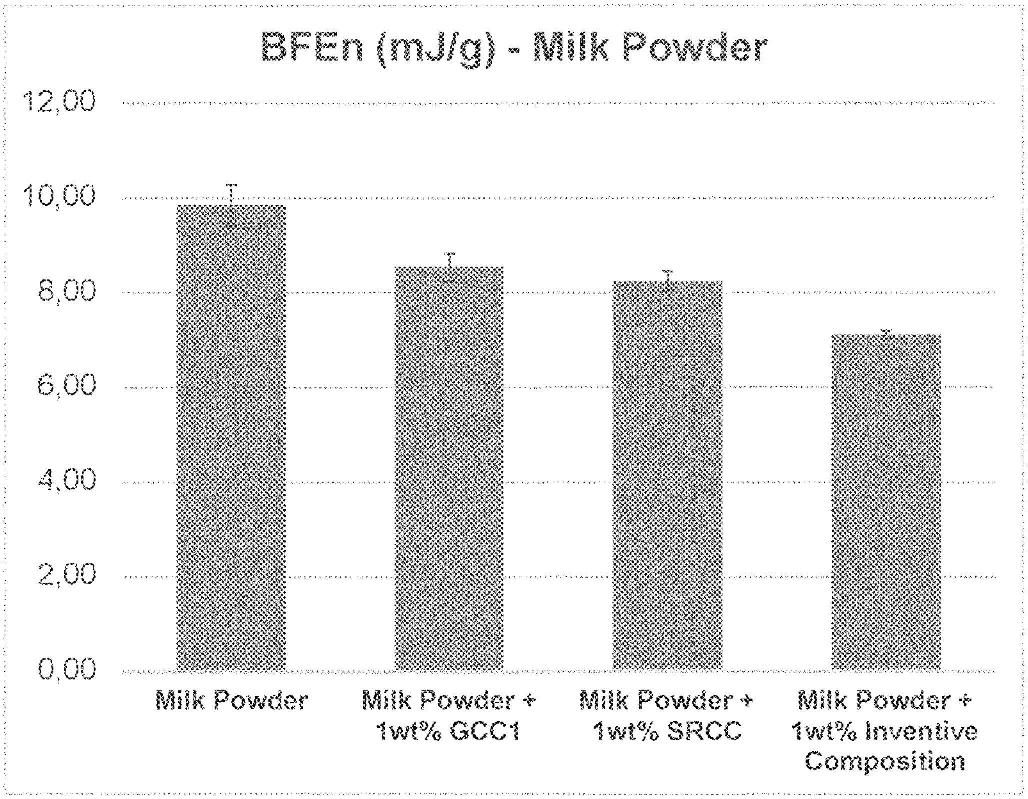

FIG. 2: Normalized basic flow energy (BFEnorm) measured for milk powder containing no additives, milk powder containing ground calcium carbonate or surface-reacted calcium carbonate and milk powder containing the inventive anticaking agent.

Figure 3:
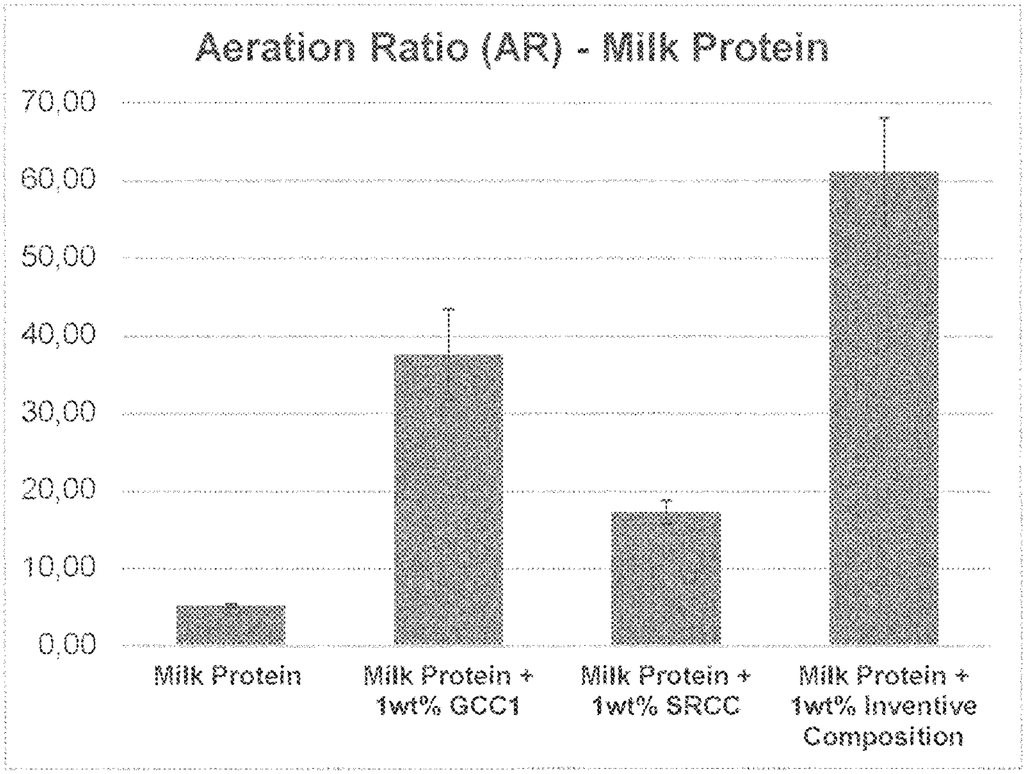

FIG. 3: Areation ratio measured for milk protein containing no additives, milk powder containing ground calcium carbonate or surface-reacted calcium carbonate and milk powder containing the inventive anticaking agent.

Figure 4:
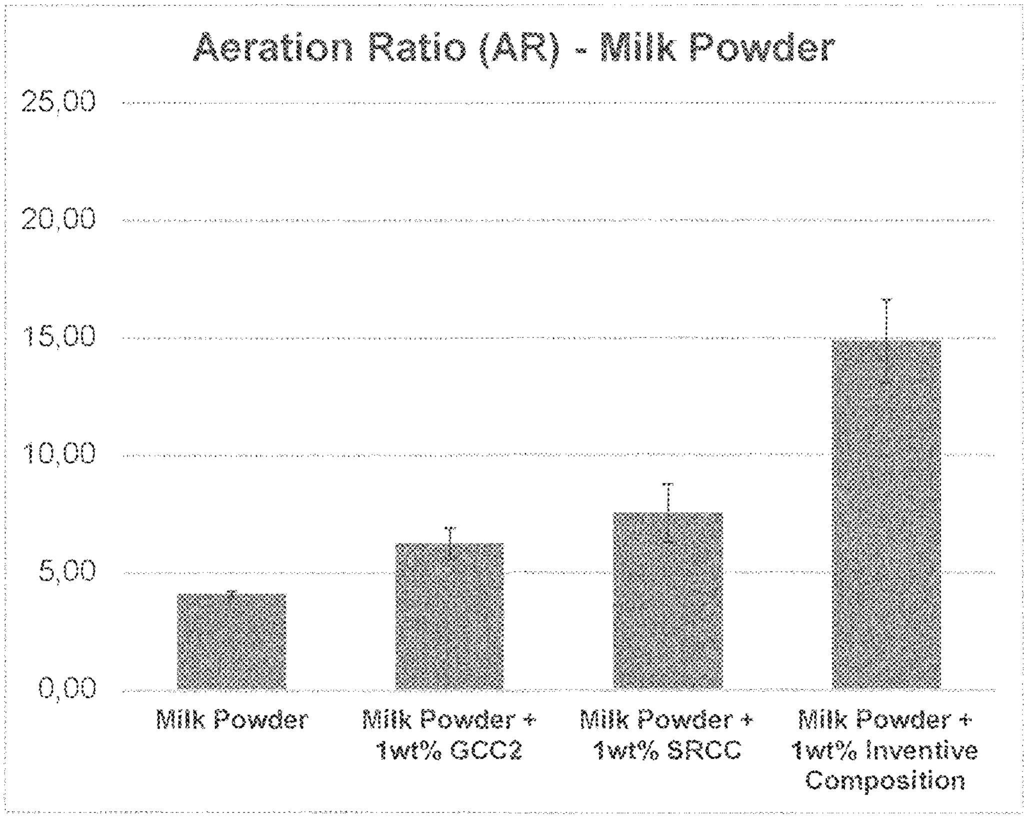

FIG. 4: Areation ratio measured for milk powder containing no additives, milk powder containing ground calcium carbonate or surface-reacted calcium carbonate and milk powder containing the inventive anticaking agent.

Figure 5:
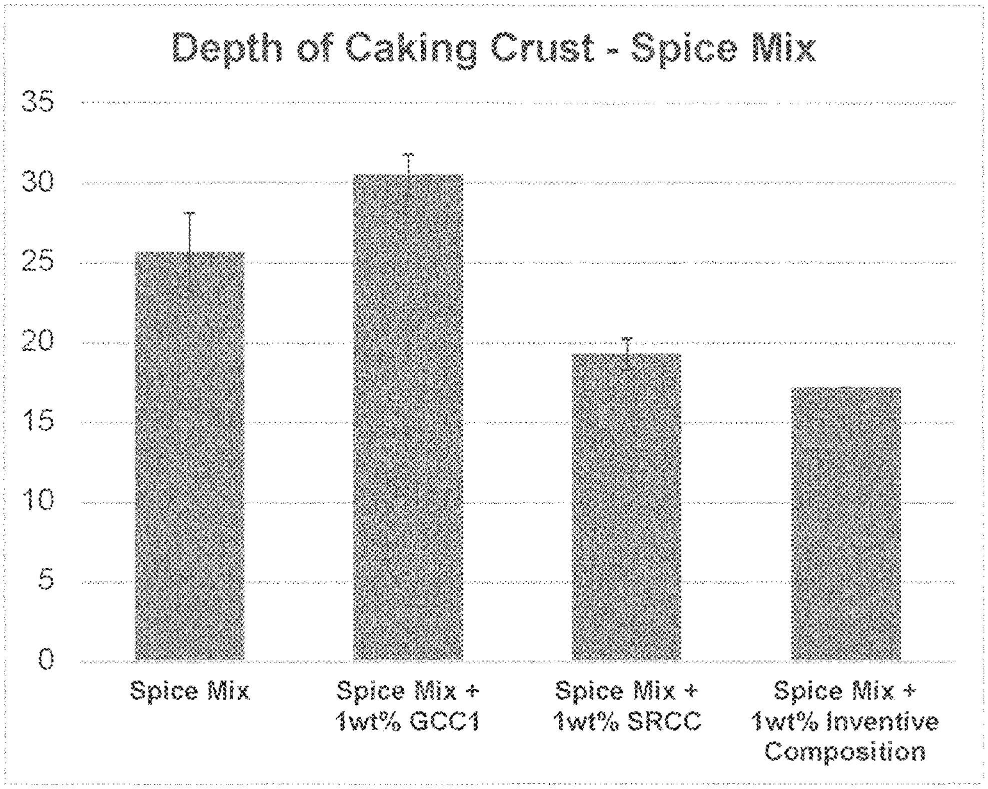

FIG. 5: Caking crust analysis for a spice mix containing no additives, a spice mix containing ground calcium carbonate or surface-reacted calcium carbonate and a spice mix containing the inventive anticaking agent. The values on the y-axis correspond to the width of a peak in the total energy plot recorded by a rheometer, which is connected to the caking crust of the mix.

Figure 6:
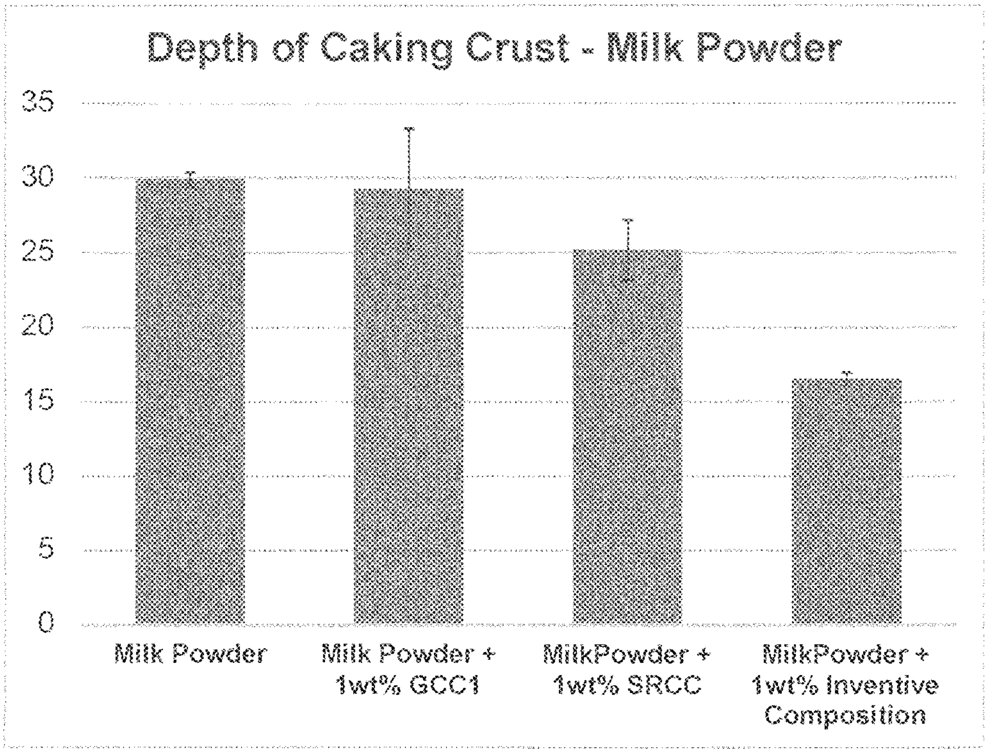

FIG. 6: Caking crust analysis measured for milk powder containing no additives, milk powder containing ground calcium carbonate or surface-reacted calcium carbonate and milk powder containing the inventive anticaking agent. The values on the y-axis correspond to the width of a peak in the total energy plot recorded by a rheometer, which connected to the caking crust of the powder.

EXAMPLES

1. Materials

Calcium Carbonate Materials:

GCC 1: Natural ground calcium carbonate; marble, from Kemalpasa, Turkey; volume-based particle size distribution d50=2.2 µm, d98=10 µm; specific surface area=1.4 m2/g.

GCC 2: Natural ground calcium carbonate; marble from Arizona, USA; volume-based particle size distribution d50=2.2 µm, d98=9 µm; specific surface area=1.3 m2/g.

SRCC: Surface-reacted calcium carbonate (SRCC) (d50 (vol)=5.1 µm, d98 (vol)=9.2 µm, specific surface area=96.1 m2/g with an intra-particle intruded specific pore volume of 1.588 cm3/g (for the pore diameter range of 0.004 to 0.4 µm).

Preparation of the SRCC:

In a mixing vessel, 10 liters of an aqueous suspension of ground limestone calcium carbonate was prepared by adjusting the solids of a ground limestone calcium carbonate having a particle size distribution of 90 wt.-% below 2 µm, based on the total weight of the ground calcium carbonate, such that a solids content of 15 wt.-%, based on the total weight of the aqueous suspension, is obtained. Whilst mixing the slurry, 2.8 kg phosphoric acid was added in form of an aqueous solution containing 30 wt.-% phosphoric acid to said suspension over a period of 10 minutes. Throughout the whole experiment the temperature of the suspension was maintained at 70° C. After the addition of the acid, the suspension was stirred for additional 5 minutes before removing it from the vessel and drying.

Inventive Calcium Carbonate-Based Composition (CCC):

Mixture of ground calcium carbonate and surface-reacted calcium carbonate in a ratio of 70:30.

The ground calcium carbonate used for the inventive calcium carbonate-based composition was GCC2 having a volume-based particle size distribution d50=2.2 µm, d98=9 µm; specific surface area=1.3 m2/g.

The surface-reacted calcium carbonate used for the inventive calcium carbonate-based composition was SRCC having a volume-based particle size distribution d50=5.1 µm, d98=9.2 µm; specific surface area=96.1 m2/g.

Base Component:

Milk powder: obtained from Hochdorf, Switzerland with volume-based particle size d50 of 61 µm.

Milk protein: obtained from Hochdorf, Switzerland with volume-based particle size d50 of 46 µm.

2. Methods

Basic Flowability Energy (BFE) and Normalized Basic Flowability Energy ($BFE_{norm}$):

The basic flowability energy (BFE) is calculated from the work done in moving the blade through the tested powder composition from the top of a vessel to its bottom, i.e. during the downward traverse. To minimize the effect of the bulk density the BFE is normalized to the mass of the powder in a given volume. The instrument which was used to determine the BFE and BFEnorm was an FT4 Powder Rheometer (Freeman Technology Ltd). The accessories of the instrument such as blades can be rotated and simultaneously moved axially into a powder sample whilst axial force and rotational force are measured. A number of control modes are available on both axis including velocity, force and torque. In the standard dynamic tests, aeration testing are automated with no operator involvement apart from sample preparation. Dynamic testing used a 48 mm dia blade and a 160 ml powder sample contained in a 50 mm borosilicate test vessel. All samples for dynamic testing were preconditioned using the instruments 'conditioning' methodology. The 'conditioning' blade action gently disturbs the powder bed and creates a uniform, lightly packed test sample that can be readily and consistently reproduced. The force and torque measured during the downward movement of blade gives the Basic flow energy of powder. The BFE was measured with the standard program of the FT4 powder rheometer with the following conditioning cycle and test cycle. Down traverse conditioning: 5° (helix angle), −60 mm/s (tip speed); up traverse conditioning: −5° (helix angle), 60 mm/s (tip speed). Test: −5° (helix angle), −100 mm/s (tip speed).

Areation Testing and Aeration Ratio:

For the aeration testing the aeration program of Freeman FT4 powder rheometer was used. For the aeration testing, air is introduced into the base of the powder column. It is subsequently determined how the introduction of air changes the flow properties by measuring the reduction in basic flow energy. The aeration testing is performed with an air velocity of 18 mm/sec. The areation ratio is the ratio of BFE (in absence of air) to BFE with the 18 mm/sec of air flow in the powder composition. The areation ratio is inversely proportional to cohesivity of the powder composition. The aeration ratio was calculated using a method of the FT4 powder rheometer the following conditioning cycle and test cycle. Down traverse conditioning: 5° (helix angle), −60 mm/s (tip speed); up traverse conditioning: 20° (helix angle), 60 mm/s (tip speed). Test: −5° (helix angle), −100 mm/s (tip speed).

Caking Tests:

An FT4 Powder Rheometer® (Freeman Technology) was used to evaluate the rheological behavior of powder compositions by measuring the flow energy of the samples before and after caking to quantify the resistance to flow. All samples were conditioned prior to being subjected to a relative humidity of RH 75%. Samples were placed in a 25 mm×25 ml cylindrical vessel and conditioned, using a powder rheometer, by passing a specially shaped blade through the powder in a prescribed manner. This creates a stable, uniform and a repeatable stress state within the sample. Excess material was removed to generate a 25 ml test sample which was then stored in a constant 75% RH environment for 48 hours (for milk powder) or 144 hours (for a spice mix) to induce caking of the powder. The fixed relative humidity of 75% was maintained in the desiccator by use of a saturated sodium chloride solution. The caking creates a crust on top of the samples which results in the appearance of a peak in the total energy plot recorded by the rheometer. The powder caking was quantified by analyzing the peaks width which correspond to the depth of the caking crust. The more caking is occurring in the powder the broader the peak becomes. Thus, a higher value of peak width indicates more caking, whereas a lower value of peak width indicates less caking.

The caking tests were performed using a method of the FT4 powder rheometer with the following conditioning cycle and test cycle. Down traverse conditioning: 5° (helix angle), −40 mm/s (tip speed); up traverse conditioning: 5° (helix angle), 40 mm/s (tip speed). Test: −5° (helix angle), −100 mm/s (tip speed).

3. Results

FIG. 1 shows BFEnorm values measured with milk protein as a base component. The BFEnorm was measured for milk protein, which 1) does not contain an anticaking agent, 2) contains 1.0 wt % of GGC2 based on the total weight of the particulate composition, 3) contains 1.0 wt % of SRCC based on the total weight of the particulate composition, and 4) contains 1.0 wt % of the inventive calcium carbonate-based composition, based on the total weight of the particulate composition.

FIG. 2 shows the BFEnorm values measured with milk powder as base component. In this series of experiments 1.0 wt % of GCC1, based on the total weight of the particulate composition, was used as a comparative example instead of GCC2.

It can be gathered from FIGS. 1 and 2 that the inventive calcium carbonate-based composition significantly lowers the BFEnorm value of a base component, i.e. the milk powder or milk protein, when added to the base component. Thus, the inventive composition has a strong anticaking effect and/or flow improvement effect on the base component. Furthermore, FIGS. 1 and 2 show that the inventive calcium carbonate-based composition has a better anticaking effect and/or flow improvement effect than ground calcium carbonate or surface-reacted calcium carbonate alone as indicated by the lower BFEnorm value for the composition including the inventive anticaking agent and the base component. Thus, there is a synergistic effect for the mixture of GCC/SRCC compared to GCC or SRCC alone, which is particularly remarkable and surprising.

FIG. 3 shows aeration ratio values measured with milk protein as a base component. The aeration ratio was measured for milk protein, which 1) does not contain an anticaking agent, 2) contains 1.0 wt % of GGC1 based on the total weight of the particulate composition, 3) contains 1.0 wt % of SRCC based on the total weight of the particulate composition, and 4) contains 1.0 wt % of the inventive calcium carbonate-based composition, based on the total weight of the particulate composition.

FIG. 4 shows aeration values measured in the same way, but with milk powder as base component. In this series of experiments 1.0 wt % of GCC2, based on the total weight of the particulate composition, was used as a comparative example instead of GCC1.

It can be gathered from FIGS. 3 and 4 that the inventive calcium carbonate-based composition significantly increases the aeration ratio of a base component, i.e. the milk powder or milk protein, when added to the base component. Thus, the inventive composition has a strong anticaking effect and/or flow improvement effect on the base component. Furthermore, FIGS. 3 and 4 show that the inventive calcium carbonate-based composition has a better anticaking effect and/or flow improvement effect than ground calcium carbonate or surface-reacted calcium carbonate alone as indicated by the higher aeration ratio value for the composition including the inventive anticaking agent and the base component. Thus, there is a synergistic effect for the mixture of GCC/SRCC compared to GCC or SRCC alone, which is particularly remarkable and surprising.

FIG. 5 shows peak width values measured as described above with a spice mix as a base component. The peak width was measured for a spice mix, which 1) does not contain an anticaking agent, 2) contains 1 wt % of GGC1 based on the total weight of the particulate composition, 3) contains 1 wt % of SRCC based on the total weight of the particulate composition, and 4) contains 1 wt % of the inventive calcium carbonate-based composition, based on the total weight of the particulate composition. As described above, the peak width measured for a sample correlates with the caking crust depth.

FIG. 6 shows peak width values measured in the same way, but with milk powder as base component.

It can be gathered from FIGS. 5 and 6 that the inventive calcium carbonate-based composition significantly decrease the peak width values of a base component, i.e. the milk powder or spice mix, when added to the base component. Thus, the inventive composition has a strong anticaking effect and/or flow improvement effect on the base component. Furthermore, FIGS. 5 and 6 show that the inventive calcium carbonate-based composition has a better anticaking effect and/or flow improvement effect than ground calcium carbonate or surface-reacted calcium carbonate alone as indicated by the lower peak depth values for the composition including the inventive anticaking agent and the base component. Thus, there is a synergistic effect for the mixture of GCC/SRCC compared to GCC or SRCC alone, which is particularly remarkable and surprising.

The invention claimed is:

1. A particulate composition comprising a calcium carbonate-based anticaking composition and a base component, wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ ion donor, wherein the carbon dioxide is formed in situ by the at least one $H_3O$ ion donor treatment and/or is supplied from an external source, wherein the particulate composition comprises the calcium carbonate-based anticaking composition in an amount of from 0.1 to 50 wt. % based on the total weight of the particulate composition, wherein the second component has a specific surface area of from 15 $m^2/g$ to 200 $m^2/g$ measured using nitrogen and the BET method.

2. The particulate composition according to claim 1, wherein the calcium carbonate-based anticaking composition consists of the first component and the second component, and/or wherein the weight ratio of the first component to the second component in the calcium carbonate-based anticaking composition is in the range of 99:1 to 1:99.

3. The particulate composition according to claim 1, wherein the base component is selected from the group consisting of a food composition, a feed composition, a nutraceutical composition, a pharmaceutical composition and a cosmetic composition.

4. The particulate composition according to claim 3, wherein the food composition is selected from the group consisting of food salt, curing salt, salt substitute, milk powder, skimmed milk powder, cream powder, egg powder, whey fat powder, protein powder, vending machine powder, grated cheese, sugar, powdered food flavour, spice, seasoning, packet soup mixture, baking mixture, pudding powder, mousse powder, and sauce powder, or wherein the feed composition is selected from the group consisting of pet food, milk replacer for animals, and mineral salt for animals.

5. The particulate composition according to claim 1, wherein the natural ground calcium carbonate is selected from the group consisting of marble, chalk, limestone, and mixtures thereof, or wherein the precipitated calcium carbonate is selected from the group consisting of precipitated calcium carbonates having an aragonitic, vateritic or calcitic crystal form, and mixtures thereof.

6. The particulate composition according to claim 1, wherein the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof.

7. The particulate composition according to claim 1, wherein the first component has a volume median particle size $d_{50}$ from 0.1 to 50 μm, and/or wherein the first component has a specific surface area of from 0.5 $m^2/g$ to 30 $m^2/g$, measured using nitrogen and the BET method.

8. The particulate composition according to claim 1, wherein the second component has a volume median particle size $d_{50}$ from 0.5 to 50 μm.

9. The particulate composition according to claim 1, wherein the calcium carbonate-based composition has a residual moisture of less than 10.0 wt. % based on the total weight of the calcium carbonate-based composition.

10. The particulate composition according to claim 2, wherein the weight ratio of the first component to the second component is in the range of 80:20 to 40:60.

11. A method for the production of the particulate composition according to claim 1, the method comprising the step of mixing the calcium carbonate-based anticaking composition with the base component, wherein the calcium carbonate-based anticaking composition comprises a first component being a natural ground calcium carbonate or a precipitated calcium carbonate, and a second component being a surface-reacted calcium carbonate, wherein the surface-reacted calcium carbonate is a reaction product of natural ground calcium carbonate or precipitated calcium carbonate with carbon dioxide and at least one $H_3O^+$ion donor, wherein the carbon dioxide is formed in situ by the at least one $H_3O^+$ion donor treatment and/or is supplied from an external source, and wherein the second component has a specific surface area of from 15 $m^2/g$ to 200 $m^2/g$ measured using nitrogen and the BET method, wherein the calcium carbonate-based anticaking composition is admixed into the base component in an amount of from 0.1 to 50 wt. %, based on the total weight of the particulate composition.

* * * * *